(12) United States Patent
Yang et al.

(10) Patent No.: US 11,109,330 B2
(45) Date of Patent: Aug. 31, 2021

(54) METHOD FOR DETERMINING CORRECTION TIME IN WIRELESS COMMUNICATION SYSTEM AND APPARATUS THEREFOR

(71) Applicant: Samsung Electronics Co., Ltd., Suwon-si (KR)

(72) Inventors: Hayoung Yang, Yongin-si (KR); Soongyoon Choi, Suwon-si (KR); Chongdon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 16/343,651

(22) PCT Filed: Mar. 14, 2017

(86) PCT No.: PCT/KR2017/002726
§ 371 (c)(1),
(2) Date: Apr. 19, 2019

(87) PCT Pub. No.: WO2018/088640
PCT Pub. Date: May 17, 2018

(65) Prior Publication Data
US 2019/0281564 A1    Sep. 12, 2019

(30) Foreign Application Priority Data

Nov. 11, 2016  (KR) .......................... 10-2016-0150218
Feb. 10, 2017  (KR) .......................... 10-2017-0018594

(51) Int. Cl.
*H04W 56/00*      (2009.01)
*H04W 74/08*     (2009.01)
(Continued)

(52) U.S. Cl.
CPC ....... *H04W 56/001* (2013.01); *H04L 27/2605* (2013.01); *H04W 56/009* (2013.01);
(Continued)

(58) Field of Classification Search
CPC ............. H04W 56/001; H04W 56/009; H04W 72/0446; H04W 74/0833; H04W 56/0015; H04L 27/2605
See application file for complete search history.

(56) References Cited

U.S. PATENT DOCUMENTS

2002/0085627 A1    7/2002  Younis
2009/0154399 A1    6/2009  Yang et al.
(Continued)

FOREIGN PATENT DOCUMENTS

EP         2621110 A1      7/2013
KR   10-2002-0038806 A    5/2002
(Continued)

OTHER PUBLICATIONS

Extended European Search Report dated Aug. 20, 2019, issued in European Patent Application No. 17868694.5-1219.
(Continued)

*Primary Examiner* — Nishant Divecha
(74) *Attorney, Agent, or Firm* — Jefferson IP Law, LLP

(57) ABSTRACT

A method and apparatus is provided for determining, by a receiving end, a correction time value according to ranging access in a wireless communication system. A reception apparatus in a wireless communication system comprises a signal period selector for selecting a first detection time interval and a second detection time interval from a RACH signal for ranging access, the RACH signal including a RACH preamble sequence, a time offset detector for detecting a first time offset and a second time offset, each corresponding to a point of time when the preamble sequence is
(Continued)

received, from the selected first detection time interval and the second detection time interval, respectively, and a time offset determiner for determining a correction time value for correcting a point of time when data is transmitted by a transmitting end in the wireless communication system, on the basis of the detected first time offset and the second time offset. This research was carried out with the support of "Pan-government Giga Korea Project" led by the Ministry of Science, ICT and Future Planning.

11 Claims, 12 Drawing Sheets

(51) Int. Cl.
   *H04L 27/26* (2006.01)
   *H04W 72/04* (2009.01)
(52) U.S. Cl.
   CPC ... *H04W 56/0045* (2013.01); *H04W 72/0446* (2013.01); *H04W 74/0833* (2013.01); *H04W 56/0015* (2013.01)

(56) References Cited

U.S. PATENT DOCUMENTS

| | | |
|---|---|---|
| 2009/0175292 A1 | 7/2009 | Noh et al. |
| 2011/0103499 A1* | 5/2011 | Cheng ............... H04W 56/0045 375/260 |
| 2012/0165004 A1 | 6/2012 | Zhang et al. |
| 2012/0224515 A1* | 9/2012 | Nakayama ........ H04W 56/0005 370/280 |
| 2013/0208679 A1 | 8/2013 | Joung et al. |
| 2013/0215861 A1 | 8/2013 | Nam et al. |
| 2013/0244652 A1 | 9/2013 | Gi et al. |
| 2015/0181595 A1* | 6/2015 | Li ......................... H04L 5/0058 370/336 |
| 2015/0188746 A1 | 7/2015 | Um et al. |

FOREIGN PATENT DOCUMENTS

| | | |
|---|---|---|
| KR | 10-2012-0044198 A | 5/2012 |
| KR | 10-2013-0101544 A1 | 9/2013 |
| KR | 10-2015-0024363 A | 3/2015 |
| KR | 10-2015-0076367 A | 7/2015 |
| KR | 10-2016-0119628 A | 10/2016 |

OTHER PUBLICATIONS

L. Sanguinetti, 'A random access algorithm for LTE systems', Wiley Online Library, pp. 49-58, (http://onlinelibrary.wiley.com/doi/10.1002/ett.2575/full) Dated Sep. 12, 2012. pp. 49 to pp. 58.
Korean Decision to Grant dated Jul. 5, 2021, issued in Korean Application No. 10-2017-0018594.

* cited by examiner

METHOD FOR DETERMINING CORRECTION TIME IN WIRELESS COMMUNICATION SYSTEM AND APPARATUS THEREFOR

TECHNICAL FIELD

The disclosure relates to a method of determining a correction time value according to ranging access by a receiving end in a wireless communication system and an apparatus for the same.

This research was carried out with the support of "Pan-government Giga Korea Project" led by the Ministry of Science, ICT and Future Planning.

BACKGROUND ART

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

The telecommunication industry including the international telecommunications union (ITU) and the 3rd partnership project (3GPP) proposes support of high speed data-supporting communication (enhanced Mobile Broadband (eMBB), an ultra-reliable low latency communications (URLLC), and massive machine type communication as three main use cases of the 5G communication system.

Implementation of the 5G communication system in a mmWave band (for example, 60 GHz) is considered. In the 5G communication system, technologies such as beamforming, massive MIMO, full dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

In the 5G communication system, a random access procedure in which a user equipment communicates with a base station through a network is defined.

A random access channel (RACH) channel may be used for random access to the base station in the state in which the user equipment does not perform uplink synchronization with the base station. The RACH channel may be divided into initial ranging in which the user equipment initially accesses the base station in the state in which the user equipment performs downlink synchronization with the base station and periodic ranging in which the user equipment accesses according to a need of the user equipment in the state in which the user equipment accesses the base station.

In an initial ranging process, if a signal is detected through a synchronization channel (SCH) from the base station, the user equipment may perform downlink synchronization in response to the SCH signal.

When the downlink synchronization is performed, the user equipment may acquire a radio frame number (RFN), subframe boundary information, and a cell ID and also acquire system information through a broadcast channel. Subsequently, the user equipment may complete the system access process by performing uplink synchronization through the RACH on the basis of configuration information of the RACH included in the system information.

Meanwhile, in the 3GPP standard, a cell radius within which uplink synchronization is possible between the base station and the user equipment through the RACH is defined as up to about a maximum of 100 km. Accordingly, in order to operate an LTE service with a broad cell radius wider than the defined radius, the base station or the user equipment is required to perform a separate operation procedure.

DISCLOSURE OF INVENTION

Technical Problem

Accordingly, an aspect of the disclosure is to provide technology for detecting a random access channel (RACH) signal to support a wide cell radius between a reception end (for example, a BS) and a transmission end (for example, a UE) spaced apart from each other by about 100 km or longer.

Further, another aspect of the disclosure is to provide time correction technology for synchronization between physical channels and a new operation scenario according thereto.

In addition, technical problems to be solved by the disclosure are not limited to the above-described technical problems, and other technical problems that have not been mentioned can be clearly understood by those skilled in the art from the following description.

Solution to Problem

In accordance with an aspect of the disclosure, a reception apparatus in a wireless communication system is provided. The reception apparatus includes: a signal interval selector configured to select a first detection time interval and a second detection time interval in random access channel (RACH) signal including RACH preamble sequences for ranging access; a time offset detector configured to detect a first time offset and a second time offset corresponding to time points at which the preamble sequences are received in the selected first detection time interval and second detection time interval, respectively; and a time offset determiner configured to determine a correction time value for correcting a time point at which a transmission apparatus of the wireless communication system transmits data, based on the detected first time offset and the detected second time offset.

In accordance with another aspect of the disclosure, a method of determining a correction time by a reception apparatus of a wireless communication system is provided. The method includes: selecting a first detection time interval and a second detection time interval in random access channel (RACH) signal including RACH preamble sequences for ranging access; detecting a first time offset and a second time offset which are time points at which the preamble sequences are received in the selected first detection time interval and the detected second detection time interval, respectively; and determining a correction time value for correcting a time point at which a transmission apparatus of the wireless communication system transmits data, based on the detected first time offset and second time offset.

In accordance with another aspect of the disclosure, a computer-readable non-volatile recording medium is provided. The computer-readable non-volatile recording medium stores a program causing a reception apparatus (or processor) to perform selecting a first detection time interval and a second detection time interval in random access channel (RACH) signals including RACH preamble sequences for ranging access; detecting a first time offset and a second time offset which are time points at which the preamble sequences are received in the selected first detection time interval and second detection time interval, respectively; and determining a correction time value for correcting a time point at which a transmission apparatus of the wireless communication system transmits data, based on the detected first time offset and second time offset.

Advantageous Effects of Invention

According to embodiments of the disclosure, a transmission end (for example, a UE) located within a wide cell radius wider than or equal to about 100 km can perform ranging access only through a change in a demodulation scheme and a scheduling procedure of a reception end (for example, a BS).

Accordingly, there may be an economical effect since an additional installation cost can be saved, and a communication service area can be expanded up to an area in which installation of the reception end is not easy (for example, an isolated area such as on the sea or an island).

In addition, other effects obtained or expected by embodiments of the disclosure will be directly or implicitly disclosed in the detailed description of the embodiments of the disclosure. For example, various effects expected according to embodiments of the disclosure will be disclosed in the detailed description to be described later.

MODE FOR THE INVENTION

Figure 1:
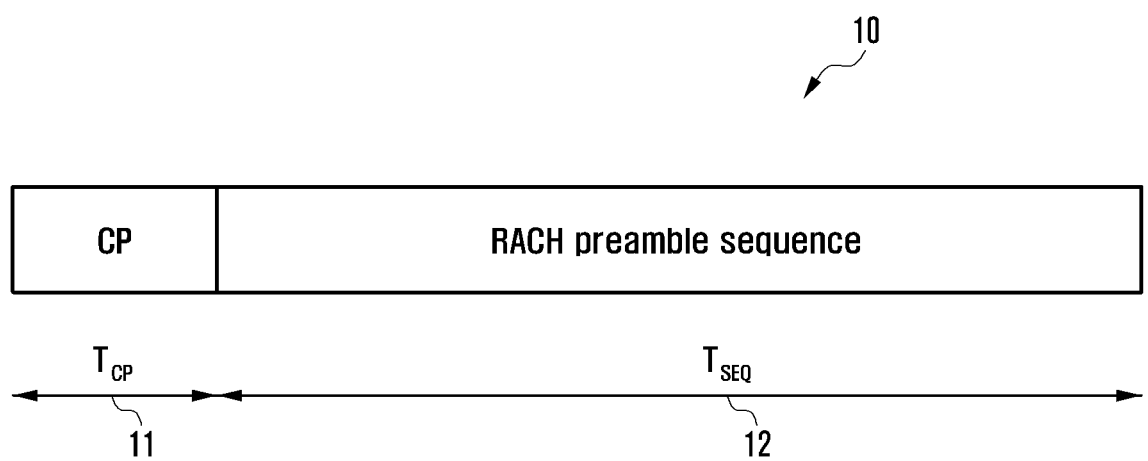
FIG. 1 illustrates RACH preambles for ranging access.

Hereinafter, operation principles of exemplary embodiments of the disclosure will be described in detail with reference to accompanying drawings. Like reference numerals designate like components in the drawings where possible even though components are shown in different drawings. In the following description of the disclosure, a detailed description of related known functions or configurations will be omitted so as not to obscure the subject of the disclosure. The terms which will be described below are terms defined in consideration of the functions in embodiments of the disclosure, and may vary depending on users, intentions of operators, or customs. Therefore, the definitions of the terms should be made based on the contents throughout the specification.

Further, in an embodiment of the disclosure, it will be appreciated that singular expressions such as "an" and "the" include plural expressions as well, unless the context clearly indicates otherwise.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

The terms used in an embodiment of the disclosure are used only to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, the terms used in an embodiment of the disclosure "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of.

Further, in an embodiment of the disclosure, when an element (first element) is referred to as being "(functionally or communicatively) connected," or "directly coupled" to another element (second element), the element may be connected directly to the another element or connected to the another element through yet another element (e.g., third element).

Unless defined otherwise, all terms used herein, including technical and scientific terms, have the same meaning as those commonly understood by a person of ordinary skill in the art to which the disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure.

In the detailed description of the disclosure, an example of interpretable meanings of some terms used in the disclosure is proposed. However, it is noted that the terms are not limited to the examples of the construable meanings which are proposed below.

A base station is a subject communicating with a user equipment, and may be referred to as a BS, a Node B (NB), an eNode B (eNB), an access point (AP) or the like.

A user equipment (or communication user equipment) is a subject communicating with the BS or another user equipment, and may be referred to as a node, a UE, a mobile station (MS), a mobile equipment (ME), a device, a terminal or the like.

In the disclosure, a transmission end (or a transmission apparatus) of a wireless communication system may be a device for transmitting a random access channel (RACH) signal and a reception end (or a reception apparatus) of a wireless communication system may be a device for receiving an RACH signal.

In the disclosure, for convenience of description, the transmission end of the communication system is referred to as a UE and the reception end of the wireless communication system is referred to as a BS, but any device can be the reception end or the transmission end according to the purpose of transmitting or receiving the RACH signal. For example, among two UEs, a UE transmitting the RACH signal may be the transmission end and a UE receiving the RACH may be the reception end.

A 3GPP LTE protocol provides various preamble sequences for UL random access.

First, the transmission end (for example, the UE) of the wireless communication system may acquire a radio frame number (RFN) and location information of a subframe through a synchronized downlink channel. Further, the transmission end may detect a location of a channel through which RACH preamble sequences are transmitted on the basis of the acquired information. The transmission end may select one of a plurality of RACH preamble sequence formats and transmit the RACH preamble sequences through the detected channel.

The reception end (for example, the BS) of the wireless communication system may detect RACH preamble sequences and transmit a timing advance (TA) command including a correction time value for uplink synchronization to the UE.

The transmission end may control a time point at which data transmission through an uplink channel is transmitted using the correction time value received from the reception end.

Meanwhile, in the LTE standard, Zadoff-Chu (ZC) sequences may be used as sequences of RACH preambles for uplink random access of the UE.

The ZC sequence may be defined as shown in Equation (1) below.

$$x_u(n) = e^{-j\frac{\pi u n(n+1)}{N_{ZC}}}, 0 \le n \le N_{ZC} - 1 \quad \text{Equation (1)}$$

In Equation (1), u denotes an index of root ZC sequence, $N_{ZC}$ denotes a length of the ZC sequence and may have a prime number (for example, 839 or 139).

FIG. 1 illustrates an RACH preamble for ranging access.

Referring to FIG. 1, the RACH preamble 10 may include a cyclic prefix (CP) interval 11 corresponding to a protection interval as a guard sample and an RACH preamble sequence interval 12.

The preamble sequence 12 may be generated with different $N_{CS}$ values for cyclic shift from the ZC sequence. At this time, when the $N_{CS}$ value is configured as the $N_{ZC}$ value, the ZC sequence may be used as one preamble sequence 12.

The 3GPP standard defines an RACH preamble format including a CP interval, an RACH preamble sequence interval, and a guard time (GT) interval corresponding to an interval for preventing interference between subsequent subframes as shown in Table 1 below to transmit the RACH preamble 10 in accordance with various types of cell radiuses.

TABLE 1

| RACH Preamble Format | Cyclic Prefix Length | Sequence Length | GT | Cell Radius |
|---|---|---|---|---|
| 0 (1 TTI) | 3168 Ts | 24576 Ts | 2976 Ts | 14.5 km |
| 1 (2 TTI) | 21024 Ts | 24576 Ts | 15840 Ts | 77.3 km |
| 2 (2 TTI) | 6240 Ts | 2 × 24576 Ts | 6048 Ts | 29.5 km |
| 3 (3 TTI) | 21024 Ts | 2 × 24576 Ts | 21984 Ts | 100.1 km |
| 4 (1 TTI) | 448 Ts | 4096 Ts | 288 Ts | 1.4 km |

Figure 2:
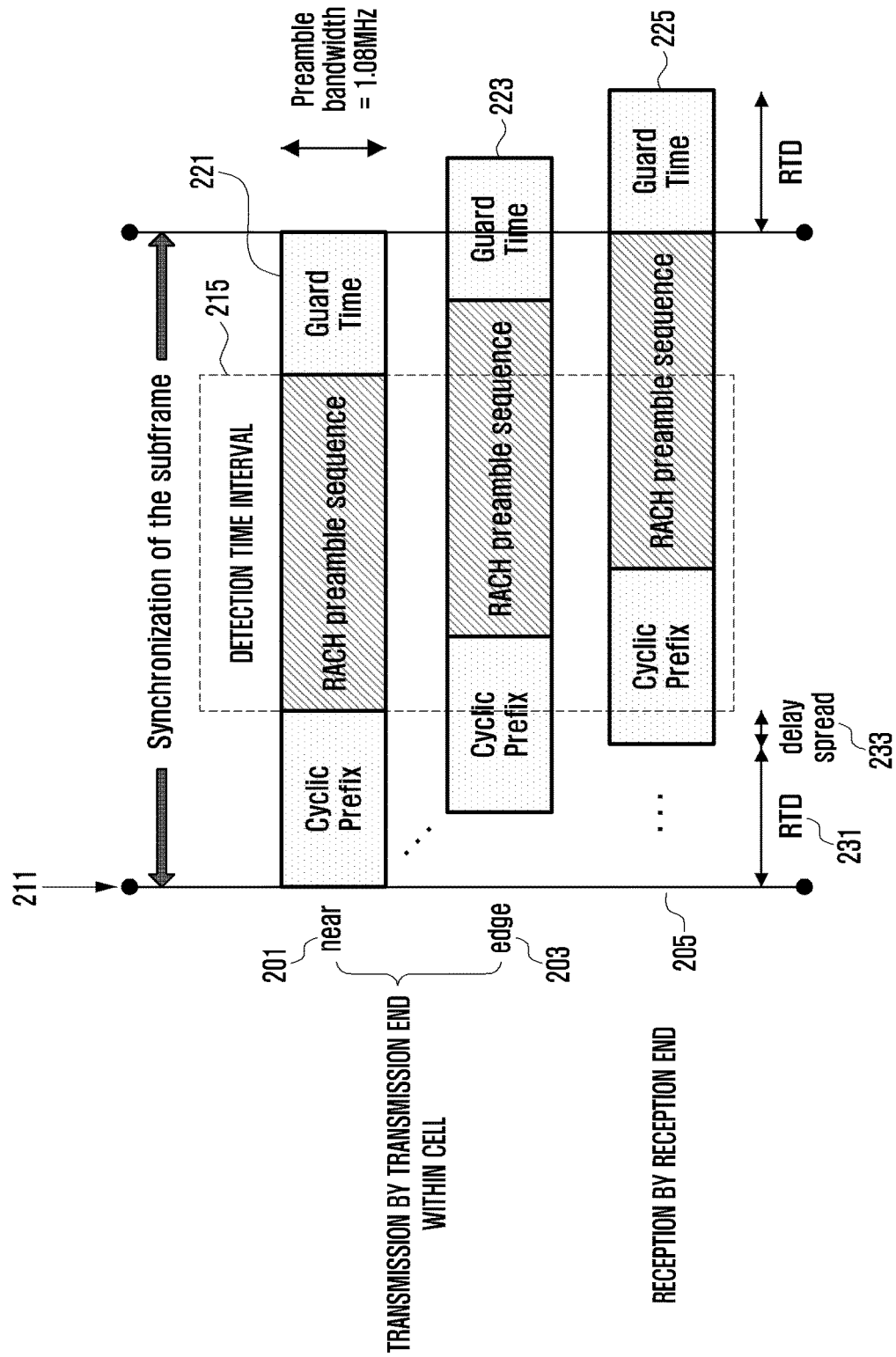
FIG. 2 illustrates a cell radius within which a reception end can support ranging access according to an RACH signal.

FIG. 2 illustrates a cell radius within which the reception end can support ranging access according to an RACH signal.

Referring to FIG. 2, the transmission end (for example, the UE) may acquire subframe boundary information as location information of the subframe through a downlink synchronization channel and transmit the RACH signal on the basis thereof.

In this case, as indicated by reference numeral 201 of FIG. 2, the transmission end adjacent to the reception end (for example, the BS) may transmit an RACH signal 221 at a start point 211 of the subframe.

As indicated by reference numeral 203 of FIG. 2, the transmission end located on a boundary of a cell covered by the reception end transmits an RACH signal 223 with a delay corresponding to a downlink channel.

In this case, as indicated by reference numeral 205 of FIG. 2, the reception end receives, from the transmission end, an RACH signal 225 delayed by a predetermined time compared to the time point at which the reception end transmits a signal through a downlink channel. The delayed time may be a round trip delay (RTD) time which is a bidirectional delay time according to a distance between the reception end and the transmission end.

The cyclic prefix (CP) serves to cover the distance between the reception end and the transmission end in which case a detection time interval of the RACH signal selected by the reception end may be indicated by reference numeral 215 of FIG. 2.

A start point of the first detection time interval 215 may be determined to not exceed the length of the CP interval in consideration of a max RTD time 231 which is a maximum bidirectional delay according to a maximum cell radius and a delay spread time 233. Further, the max RTD may be determined within the length of the GT interval to avoid interference with another subframe. Accordingly, max RTD=min(CP−delay spread, GT).

The reception end may predict the maximum cell radius on the basis of the RACH signal format. In this case, the maximum cell radius for each of the RACH signal formats complying with the 3GPP standard may refer to a value of the cell radius of Table 1 above.

Referring to Table 1, a maximum cell radius supportable by 3GPP LTE may be about 100 km. In this case, a maximum TA value by which the reception end can control the time point at which the transmission end transmits data through the uplink of the terminal after detecting the RACH signal may be 1282TA(=20512 Ts, Ts=1/30.72 MHz).

Figure 3:
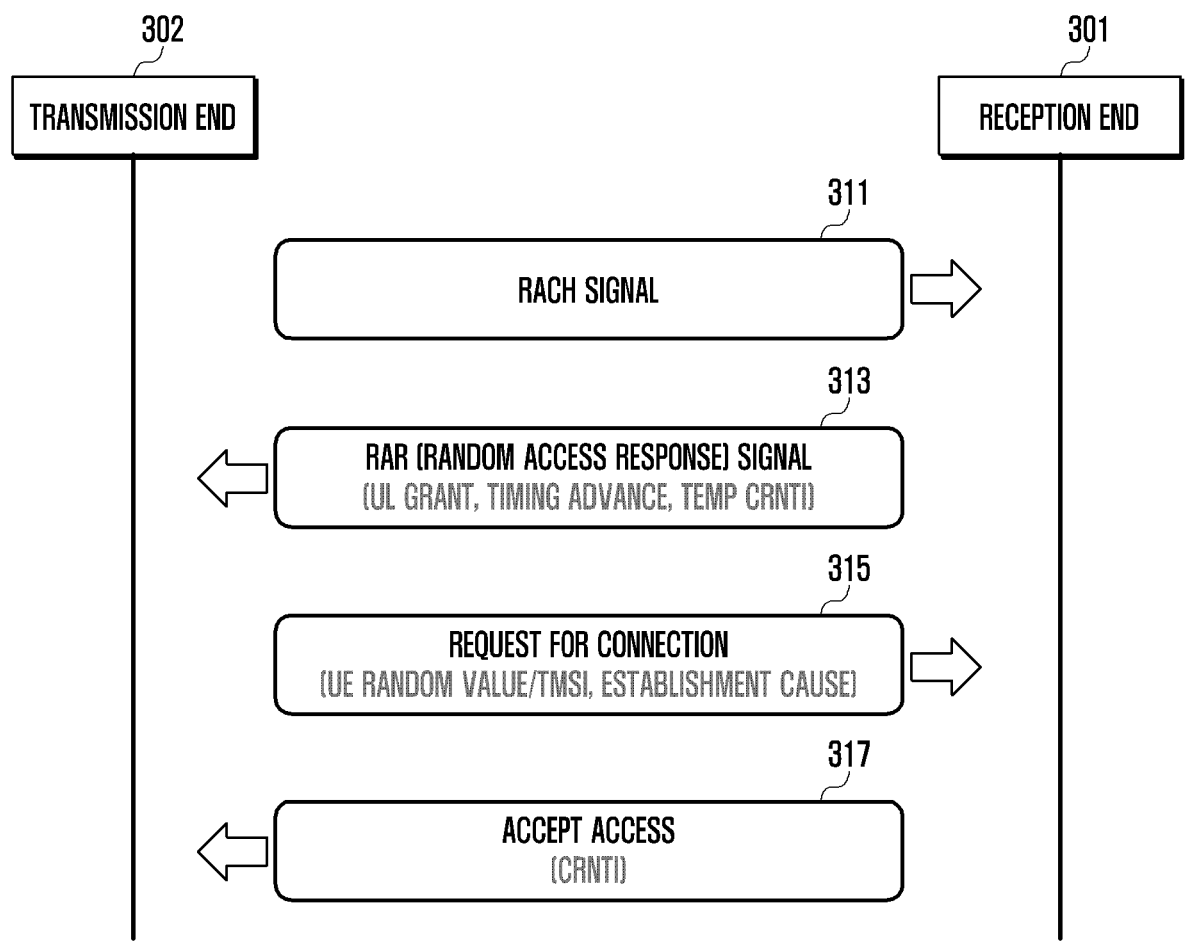
FIG. 3 illustrates an uplink synchronization process between a transmission end and a reception end.

FIG. 3 illustrates an uplink synchronization process between the transmission end and the reception end.

Referring to FIG. 3, in step 311, a reception end (for example, a BS) 301 may receive an RACH signal including a preamble sequence from a transmission end (for example, a UE) 302.

In step 313, the reception end 301 may insert the TA command including the correction time value for correcting the time point at which the transmission end 302 transmits data on into a random access response (RAR) signal on the basis of the received RACH signal and transmit the TA command to the transmission end 302.

Accordingly, in step 315, the transmission end 302 may correct the data transmission time point on the basis of the correction time value received in step 313 and make a request for connection to the reception end 301 to synchronize with the reception end 301 for call connection.

When the reception end 301 accepts the connection in response thereto in step 317, the transmission end 302 may synchronize with the reception end 301 in accordance with the uplink subframe boundary.

According to the RACH preamble format complying with the current 3GPP standard, the reception end may cover access of the transmission end up to the cell radius of about 100 km.

However, according to the wide use of LTE service and an increase in power and efficiency of devices, covering a wider cell radius may be required.

Accordingly, in order to increase the cell radius covered by the reception end, a method of changing the standard such as increasing the CP length or the GT length of the RACH preamble may be considered. However, as the length of the RACH preamble format increases, allocation of more resources of the subframe is requested and thus an amount of data transmission may be reduced.

Accordingly, a technology by which the reception end can cover a wider cell radius while complying with the 3GPP standard is needed.

According to various embodiments, in order to support a wide cell radius having a wide range, a method of detecting a time offset in a wide range and a method of performing uplink synchronization between the reception end and the transmission end on the basis of the time advance (TA) value which is the detected correction time value may be presented.

Figure 4:
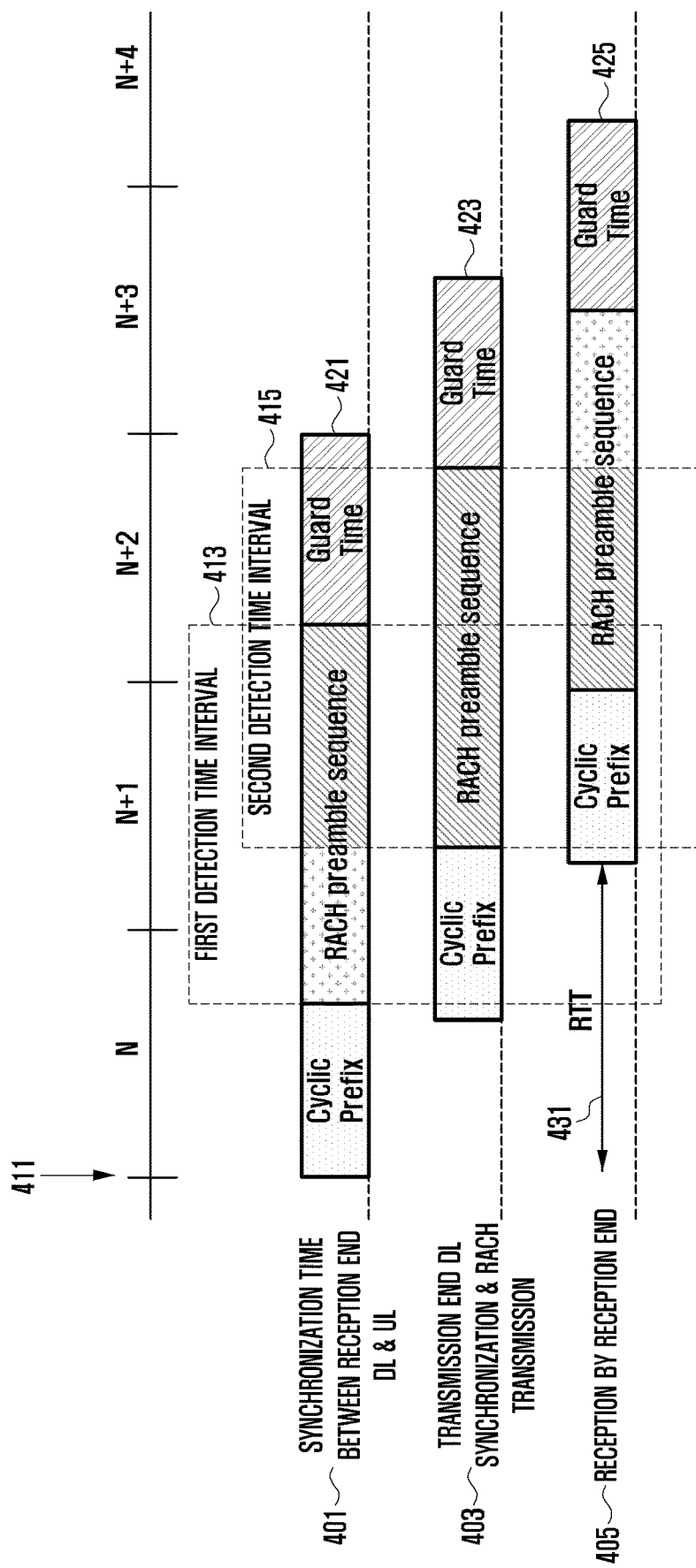
FIG. 4 illustrates a process in which the reception end supports ranging access of a wide cell radius according to an embodiment of the disclosure.

FIG. 4 illustrates a process in which the reception end supports ranging access of a wide cell radius according to an embodiment of the disclosure.

An RACH preamble format used in FIG. 4 may be RACH preamble format 3 which can support a cell radius of up to about 100 km.

RACH preamble format 3 has the form in which a base sequence having a sequence length of 24576 Ts repeats in a time domain and uses an RACH preamble sequence having a length of 2×24576 Ts. In this case, the CP may use a length of 21024 Ts which is the part of the base sequence.

In FIG. 4, the reception end may select a first detection time interval 413 with a delay corresponding to about the CP length from a subframe synchronization start point 411 in consideration of a round trip delay (RTD) time and detect an RACH signal in the selected interval. That is, the reception end may detect a preamble sequence in the first detection time interval 413 and detect a time offset based thereon. Further, in order to support a wide cell radius exceeding about 100 km, the reception end may select a second detection time interval 415 with a delay corresponding to about the CP length from the first detection time interval 413 in consideration of the RTD time and detect the RACH signal in the selected interval. That is, the reception end may detect the preamble sequence in the second detection time interval 415 and detect a time offset based thereon.

For example, as indicated by reference numeral 401 of FIG. 4, the transmission end adjacent to the reception end may transmit an RACH signal 421 at the subframe start point 411.

As indicated by reference numeral 403 of FIG. 4, the transmission end (for example, the UE) located on a boundary of a cell having a radius of about 200 km which is about twice the 3GPP standard may transmit an RACH signal 423 with a delay corresponding to a downlink channel.

In this case, the reception end receives an RACH signal 425 delayed by a predetermined time 431 compared to a time point at which a signal is transmitted through a downlink channel.

When the reception end selects the first detection time interval 413 and detects the RACH signal 425, the reception end may detect the deteriorated RACH signal 425 due to a loss of sample data in the first detection time interval 413. That is, there is ambiguity corresponding to the length (24567 Ts=1536 TA=0.8 msec) of the preamble sequence, so that the reception end may have difficulty in estimating the time offset. For example, it may be difficult to distinguish the transmission end located apart by about 80 km from the reception end and the transmission end located apart by about 200 km from the reception end through the estimated time offset value.

However, when the reception end selects the second detection time interval 415 and detects the RACH signal, even the transmission end spaced apart by about 200 km from the reception end can detect the preamble sequence and the time offset can be estimated without deterioration of the RACH signal due to a loss of sample data.

In other words, the transmission end can transmit the RACH signal without any change in the standard or configuration. When the reception end selects the RACH signal in different detection intervals and detects the time offset from the RACH signal in the detection interval, even the transmission end spaced apart by about 200 km can detect the preamble sequence and the time offset can be estimated.

Meanwhile, in this case, two detections may be performed on the same RACH signal, and an additional block for determining whether the reception end transmitting the RACH signal is located within a short-range radius between 0 km and about 100 km or within a long-range radius between 100 km and about 200 km on the basis of the detection result may be required.

When first and second time offsets are detected in different detection intervals for the same RACH signal, the reception end may determine a correction time value for correcting a time point at which the transmission end transmits data on the basis of the first and second time offsets. As illustrated in FIG. 3, the reception end may insert the TA command including the correction time value into the RAR signal and transmit the TA command to the transmission end (UE). The transmission end receiving the RAR signal transmits data through an uplink channel after putting the transmission time point forward by the correction time value, thereby establishing synchronization of the uplink channel.

Figure 5:
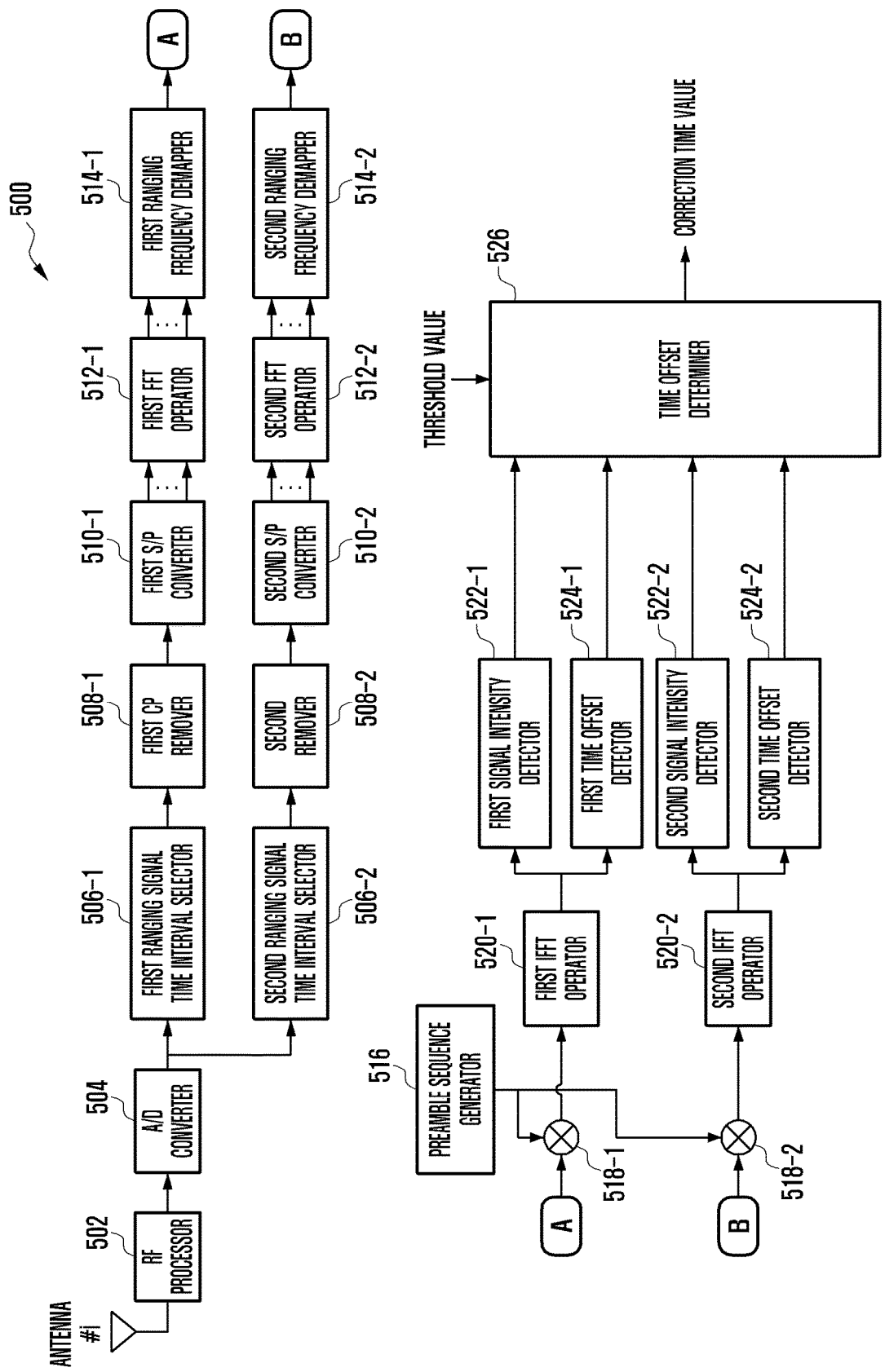
FIG. 5 is a block diagram illustrating the reception end supporting ranging access of the wide cell radius according to an embodiment of the disclosure.

FIG. 5 illustrates blocks for detecting an RACH signal by a reception end supporting ranging access of a wide cell radius according to an embodiment of the disclosure.

In a first detection time interval, a reception end 500 (for example, the BS) may select sample data from an RACH signal transmitted by a transmission end, detect a preamble sequence, and detect a first time offset on the basis of the detected preamble sequence. The reception end 500 may process the same detection in a second detection time interval delayed by about 1282TA from the first detection time interval on the basis of a round trip delay (RTD) time of the radius of about 100 km. That is, in the second detection time interval, the reception end 500 may select sample data from the RACH signal transmitted by the transmission end, detect a preamble sequence, and detect a second time offset on the basis of the detected preamble sequence.

Referring to FIG. 5, the reception end 500 may include a path through which the detection is processed in the first detection time interval and a path through which the detection is processed in the second detection time interval.

In FIG. 5, the reception end 500 may include an RF processor 502, an analog to digital (A/D) converter 504, a first ranging signal time interval selector 506-1, a second ranging signal time interval selector 506-2, a first CP remover 508-1, a second CP remover 508-2, a first serial to parallel (S/P) converter 510-1, a second S/P converter 510-2, at least one first fast Fourier transform (TTF) operator 512-1, at least one second FFT operator 512-2, a first ranging frequency demapper 514-1, a second ranging frequency demapper 514-2, a preamble sequence generator 516, a first code demodulator 518-1, a second code demodulator 518-2, a first inverse fast Fourier transform (IFFT) operator 520-1, a second IFFT operator 520-2, a first signal intensity detector 522-1, a second signal intensity detector 522-2, a first time offset detector 524-1, a second time offset detector 524-2, and a time offset determiner 526.

Referring to FIG. 5, the RF processor 502 includes a filter and a frequency converter, and converts a radio frequency (RF) band signal received through a reception antenna into a baseband signal and outputs the baseband signal. The A/D converter 504 converts an analog baseband signal from the RF processor 502 into a digital signal (sample data) and outputs the digital signal. Each of the first ranging time interval selector 506-1 and the second ranging time interval selector 506-2 selects a time interval from the sample data from the A/D converter 504 and outputs the selected time interval. Each of the first remover 50-1 and the second remover 508-2 removes a CP interval which is a protection interval from the sample data in the selected time interval and outputs the same data.

Each of the first S/P converter 510-1 and the second S/P converter 510-2 converts and outputs the sample data from which the CP interval is removed in parallel. Each of the first FFT operator 512-1 and the second FFT operator 512-2 performs a fast Fourier transform (TTF) operation on the sample data converted in parallel and outputs data in a frequency domain.

Each of the first ranging frequency demapper 514-1 and the second ranging frequency demapper 514-2 selects preamble data from the data in the frequency domain and outputs the preamble data.

The preamble sequence generator 516 sequentially generates preamble sequences and provides the same to the first sequence demodulator 518-1 and the second sequence demodulator 518-2.

Each of the first sequence demodulator 518-1 and the second sequence demodulator 518-2 performs sequence demodulation by multiplying preamble sequences from the first ranging frequency demapper 514-1, the second ranging frequency demapper 514-2, and the preamble sequence generator 516, thereby generating correlation data corresponding to the number of sequences.

Each of the first IFFT operator 520-1 and the second IFFT operator 520-21 operates the correlation data and outputs correlation data in the time domain.

The first signal intensity detector 522-1 and the second signal intensity detector 522-2 detect peak power or a normalized signal to noise ratio (SNR) in the correlation data. That is, the first signal intensity detector 522-1 and the second signal intensity detector 522-2 detect a first signal intensity of the RACH signal and a second signal intensity of the RACH signal in the first detection time interval and the second detection time interval, respectively.

Each of the first time offset detector 524-1 and the second time offset detector 524-2 detects a time offset from the correlation data and outputs the time offset.

That is, the first time offset detector 524-1 and the second time offset detector 524-2 detects a first time offset and a second time offset which are time points at which preamble sequences of the RACH signal are received in the first detection time interval and the second detection time interval, respectively.

The time offset determiner 526 may determine a correction time value for controlling a time point at which the transmission end transmits data corresponding to the RACH signal through the signal intensity and the time offset value detected in the first detection time interval and the signal intensity and the time offset detected in the second detection time interval.

The reception end 500 may insert the finally determined correction time value into the RAR signal which is a response signal of the RACH signal and transmit the RAR signal to the transmission end.

Figure 6:
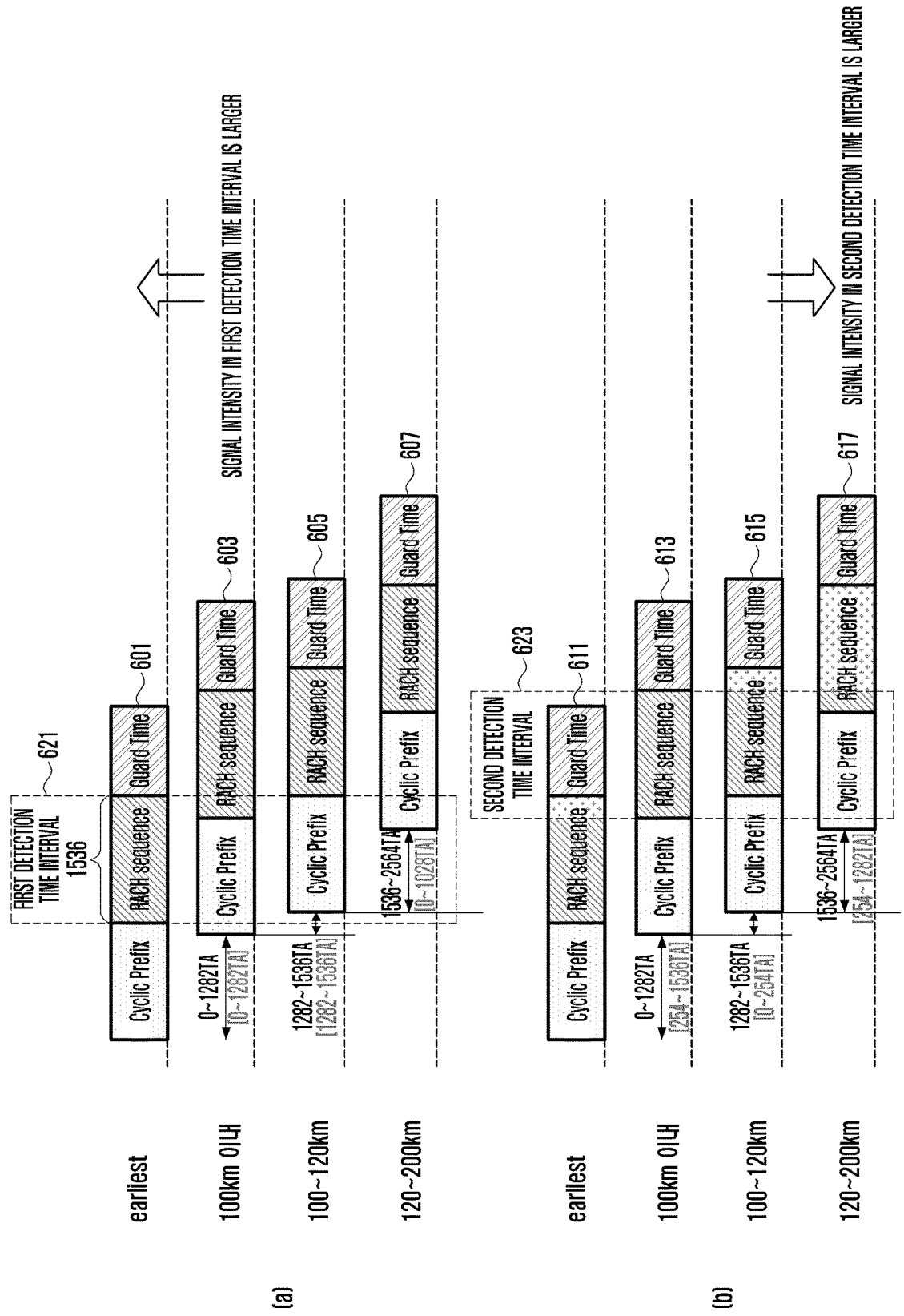
FIG. 6 illustrates a process in which a time offset determiner estimates a time offset according to an RACH signal according to an embodiment of the disclosure.

FIG. 6 illustrates a process in which the time offset determiner estimates a time offset according to an RACH signal according to an embodiment of the disclosure.

When it is assumed that the reception end supports a cell radius of up to about 200 km, FIG. 6 shows an RACH signal received by the reception end according to a distance between the reception end and the transmission end.

Referring to FIG. 6, a range which should be detected by the reception end to support the cell radius of about 200 km may be 0 to 2564 TA, the length of the RACH preamble sequence may be 1536 TA, and a time offset estimated in each interval may be 0 to 1536 TA.

FIG. 6A shows a first detection time interval 621 and uses square brackets "[ ]" to express a time offset estimated in the time interval.

At this time, a start point of the first detection time interval 621 may be located at a time point delayed by a predetermined time from the subframe start point in consideration of a round trip delay (RTD) time between the reception end and the transmission end. The predetermined time may be determined in consideration of a length of the cyclic prefix (CP)

according to RACH preamble format 3 which can support, for example, the cell radius of up to about 100 km.

FIG. 6B shows a second detection time interval 623 and uses square brackets "[ ]" to express a time offset estimated in the time interval.

At this time, a start point of the second detection time interval 621 may be located at a time point delayed by a predetermined time from the start point of the first detection time interval 621 in consideration of a round trip delay (RTD) time between the reception end and the transmission end. The predetermined time may be determined in consideration of a length of the cyclic prefix (CP) according to RACH preamble format 3 which can support, for example, the cell radius of up to about 100 km.

For example, when the RACH signal of a short-range UE having the cell radius within about 100 km is detected, the time offset detected in the first detection time interval 621 may be a value between 0 and 1282 TA and the value may be estimated as a real time offset value. On the other hand, when the RACH signal of the short-range UE is detected in the second detection time interval 623, the time offset may be estimated as a value between 254 TA and 1536 TA since the subframe start point is delayed by 1282 TA. That is, the detected value may have an offset.

That is, a time offset of an RACH signal 601 received by the UE adjacent to the BS in the first detection time interval 621 of FIG. 6A may be 0 TA. A time offset of an RACH signal 603 received by the short-range UE within the cell radius of about 100 km may be a value between 0 TA and 1282 TA. A time offset of an RACH signal 605 received by the long-range UE within the cell radius of about 100 km to 120 km may be a value between 1282 TA and 1536 TA.

Meanwhile, a second time offset detected in the second detection time interval 623 of FIG. 6A may be converted into a modulo value in consideration of the round trip delay (RTD) length. For example, the detected second time offset may be estimated by being converted into a value of (time offset+1282TA)mod 1536TA.

Accordingly, a time offset of an RACH signal 613 received by the short-range UE within the cell radius of about 100 km in the second detection time interval 623 of FIG. 6B may be estimated as a value between 254TA and 1536TA. A time offset of an RACH signal 615 received by the long-range UE within the cell radius of about 100 km to 120 km may be estimated as a value between 0TA and 254TA. A time offset of an RACH signal 617 received by the long-range UE within the cell radius of about 120 km to 200 km may be estimated as a value between 254TA and 1282TA.

Meanwhile, since only some of the RACH signals exist in an interval exceeding 1536TA in FIG. 6A, the time offset detection value may have ambiguity.

Accordingly, in FIGS. 6A and 6B, the signal intensity of each of the RACH signals may be detected in the first detection time interval 621 and the second detection time interval 623. For example, each of the first signal intensity detector 522-1 and the second signal intensity detector 522-2 of FIG. 5 may detect peak power or a normalized signal to noise ratio (SNR) in its own time interval.

In this case, with respect to the long-range UE (transmission end) located within the cell radius of about 100 km or wider, the RACH signals may be detected as having only partially full signal intensities in the first detection time interval 621 and the RACH signals may appear as having completely full signal intensities in the second detection time interval 623.

On the other hand, with respect to the short-range UE located within the cell radius of about 100 km, the RACH signals may be detected as having only partially full signal intensities in the first detection time interval 621 and the RACH signals may appear as having completely full signal intensities in the second detection time interval 623.

Accordingly, the reception end (BS) may determine whether the transmission end (UE) transmitting the RACH signal is the UE located in a short range or the UE located in a long range on the basis of the time offset and the signal intensity detected in each of the first detection time interval 621 and the second detection time interval 623.

Figure 7:
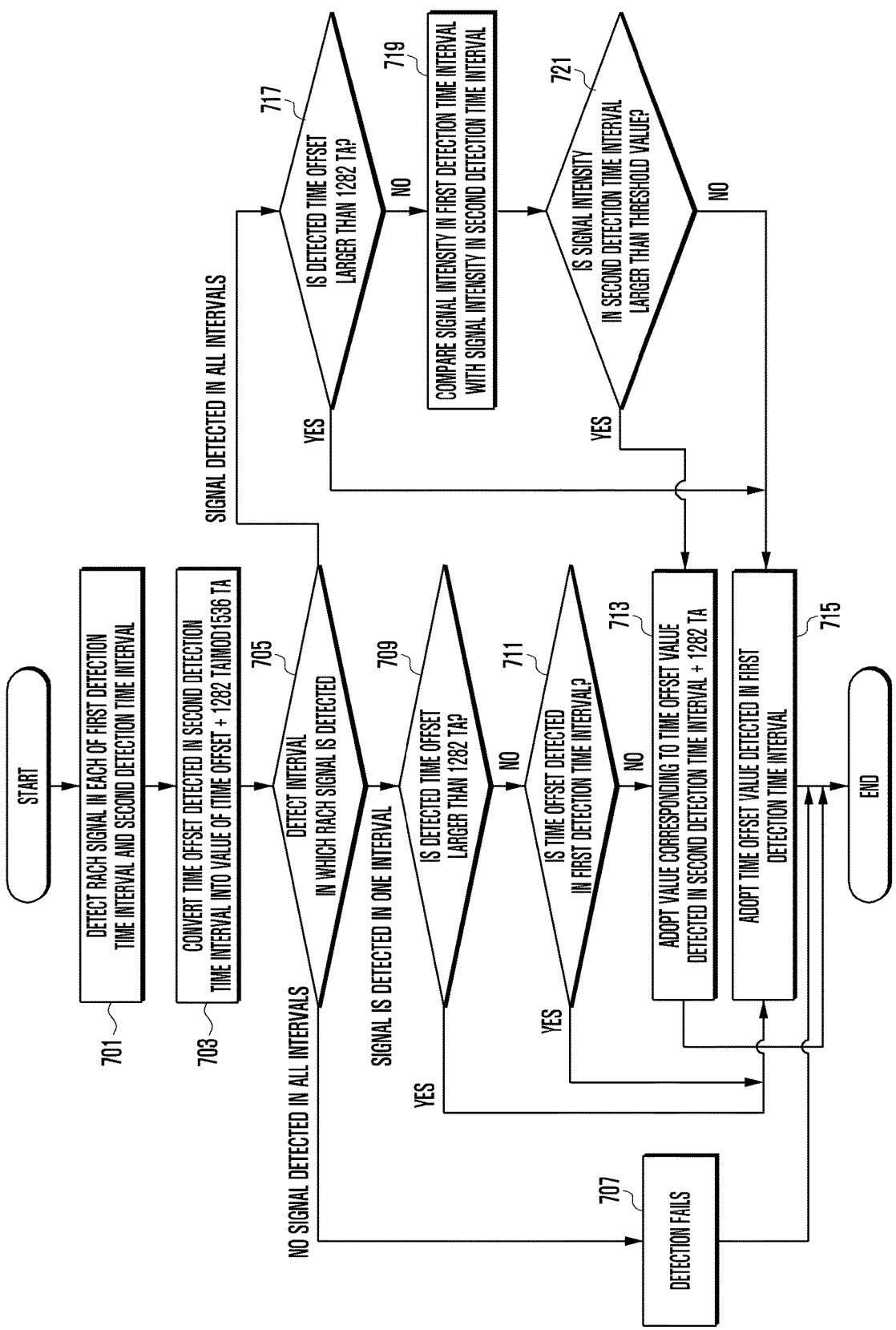
FIG. 7 is a flowchart illustrating a process of estimating a time offset according to an embodiment of the disclosure.

FIG. 7 is a flowchart illustrating a process of estimating a time offset according to an embodiment of the disclosure.

Referring to FIG. 7, in step 701, the reception end (for example, the BS) may detect an RACH signal in each of the first detection time interval and the second detection time interval.

Subsequently, in step 703, the reception end may convert a time offset detected in the second detection time interval into a value of (time offset+1282TA) mod 1536 TA.

In step 705, the reception end may determine an interval in which the time offset is detected.

When no RACH signal is detected in all intervals including the first detection time interval and the second detection time interval on the basis of the determination result of step 705, the reception end may determine that detection of the time offset fails in step 707.

Meanwhile, when the RACH signal is detected in only one of the two intervals including the first detection time interval and the second detection time interval, the reception end may determine whether the detected time offset is larger than 1282 TA in step 709.

When the detected time offset is larger than 1282 TA on the basis of the determination result of step 709, the reception end may adopt the time offset detected in the first detection time interval in step 715.

On the other hand, when the detected time offset is smaller than 1282 TA on the basis of the determination result of step 709, the reception end may determine that the detected time offset is detected in the first detection time interval in step 711.

When the detected time offset is detected in the first detection time interval on the basis of the determination result of step 711, the reception end may adopt the time offset value detected in the first detection time interval in step 715.

On the other hand, when the detected time offset is detected in the second detection time interval on the basis of the determination result of step 711, the reception end may adopt a value obtained by adding the time offset detected in the second detection time interval and 1282 TA.

Meanwhile, when it is determined that the time offset is detected in both the first detection time interval and the second detection time interval on the basis of the determination result of step 705, the reception end may determine whether the detected time offset is larger than 1282 TA in step 717.

When the detected time offset is larger than 1282 TA on the basis of the determination result of step 717, the reception end may adopt the time offset detected in the first detection time offset in step 715.

Meanwhile, when the detected time offset is smaller than 1282 TA on the basis of the determination result of step 717, the reception end may compare the RACH signal intensity in the first detection time interval with the RACH signal intensity in the second detection time interval in step 719.

In step 721, the reception end may determine whether the signal intensity in the second detection time interval is larger than a predetermined threshold value on the basis of the comparison result of step 719.

When the signal intensity in the second detection time interval is larger than the threshold value on the basis of the determination result of step 721, the reception end may adopt a value obtained by adding the time offset detected in the second detection time interval and 1282 TA in step 713.

On the other hand, when the signal intensity in the second detection time interval is smaller than the threshold value, the reception end may adopt the time offset value detected in the first detection time interval in step 715.

The reception end may estimate the time offset value adopted through the process of FIG. 7 as a time offset value corresponding to the RACH signal.

The reception end may determine a time advance (TA) value which is the correction time value for correcting a time point at which data is transmitted using the estimated time offset and perform uplink synchronization between UEs on the basis thereof.

Meanwhile, a range for providing the time advance (TA) value to the transmission end through the RAR according to the 3GPP standard is limited to 1282 TA (=20512 Ts) and thus may be insufficient to cover the cell radius of about 100 km or wider. In order to solve the problem, the range of the TA value defined in the 3GPP standard may be controlled to be wider.

Alternatively, without any change in the conventional standard, the reception end (BS) may transmit the TA value separately to the short-range transmission end (UE) located in a short range and the long-range transmission end (UE) located in a long range and improve a scheduler and modem to support a wide cell. Hereinafter, three embodiments for improving the scheduler and the modem to support the wide cell are described but are not limited thereto, and the wide cell can be supported through more various implementations.

According to a first embodiment, the reception end (for example, the BS) may expand a modem receiver and support a wide cell of about 100 km or wider.

The reception end may detect a delay time for each transmission end which is a distance to each transmission end (for example, UE) by detecting an RACH signal and may transmit a correction time value separately to a short-range transmission end located in a short range corresponding to the cell radius of about 100 km or narrower and a long-range transmission end located in a long range corresponding to the cell radius of about 100 km or wider.

For example, the reception end may transmit the correction time value determined such that an OTA value is a reference as the uplink synchronization location to transmission ends located in the short range.

On the other hand, the reception end may transmit the correction time value determined such that a value of 1282 TA (=66.6 usec) delayed by a predetermined time is a reference as the uplink synchronization location to UEs located in the long range. In this case, a TA' value which is the correction time value may be TA'=measured TA−1282TA, that is, a value obtained by subtracting 1282 TA from the estimated time offset. That is, the correction time value may be a value determined to transmit data with a predetermined time delay from the uplink synchronization location by the transmission end in consideration of the RTD time.

Accordingly, when receiving data through the uplink channel, the reception end may receive data based on the subframe boundary at the OTA time point and the subframe boundary at the time point offset by the time of 1282 TA.

Subsequently, a medium access control (MAC) digital signal processor (DSP) may compare respective pieces of processed information received by the modem. The MAC DSP may determine that received information of the modem having passed through cyclic redundancy check is normal and perform MAC processing.

Figure 8:
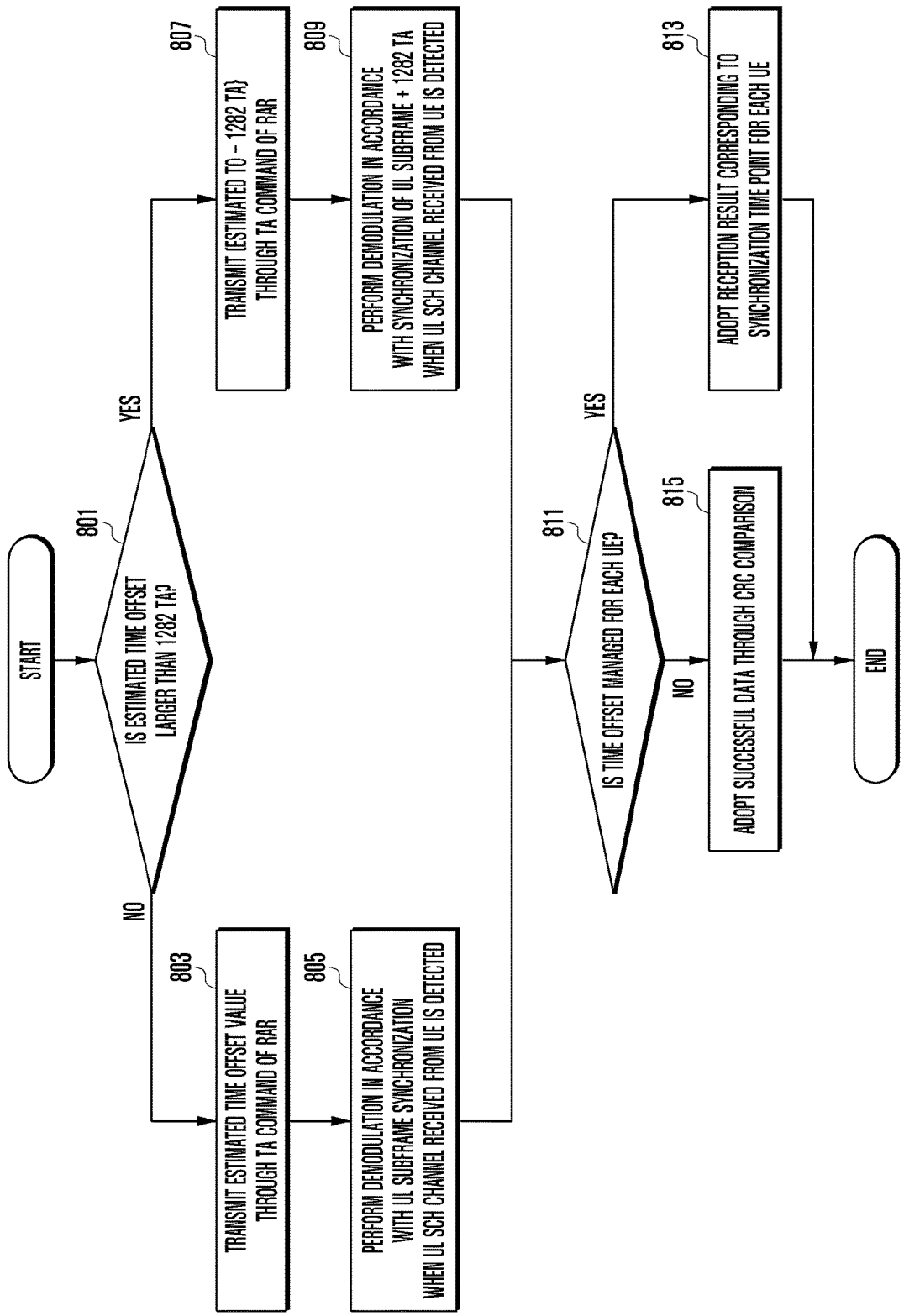
FIG. 8 is an example of a flowchart illustrating the operation of supporting uplink synchronization of a wide cell radius according to an embodiment of the disclosure.

FIG. 8 is an example of a flowchart illustrating the operation of supporting uplink synchronization in a wide cell radius according to an embodiment of the disclosure.

Referring to FIG. 8, the reception end may expand a modem receiver according to a first embodiment and support uplink synchronization in the wide cell radius.

The reception end may determine a correction time value for controlling a time point at which the transmission end of the wireless communication system transmits data on the basis of the time offset estimated in FIG. 7.

First, in step 801, the reception end may determine whether a time offset estimated from the RACH signal is larger than or equal to 1282 TA.

When the time offset estimated form the RACH signal is equal to or smaller than 1282 TA, the reception end may insert a TA command including the estimated time offset value as the correction time value into an RAR signal and transmit the RAR signal to the transmission end (for example, the UE) located in the short range in step 803.

The reception end may perform demodulation by synchronizing data through an uplink synchronization channel (SCH) received from the transmission end in accordance with the OTA time point of the uplink subframe boundary in step 805.

On the other hand, when the estimated time offset is larger than or equal to 1282 TA on the basis of the determination result of step 801, the reception end may insert a TA command including a value obtained by subtracting 1282 TA from the estimated time offset as the correction time value into an RAR signal and provide the RAR signal to the transmission end in step 807.

When detecting data through an uplink SCH received from the transmission end, the reception end may perform demodulation by synchronizing the data at the time point offset by uplink subframe boundary+1282 TA in step 809.

After step 805 or 809, the reception end may determine whether the time offset is managed for each transmission end in step 811.

When the time offset is managed for each UE, the reception end may adopt a reception result corresponding to the synchronization time point for each reception end in step 813.

On the other hand, when the time offset is not managed for each UE, the reception end may determine that data having passed through cyclic redundancy check (CRC) is normal and perform MAC processing in step 815.

According to a second embodiment, there is a method of changing the scheduler and supporting the wide cell of 100 km or wider.

The reception end distinguishes the transmission end located in the short range and the transmission end located in the long range according to each transmission time interval (TTI) and thus may perform scheduling to prevent muxing between subframes in processing through the same TTI.

The reception end may configure the TA command to be distinguished on the basis of the time point of 0 TA and the time point of 1282 TA as the uplink synchronization location and transmit the TA command to the transmission end.

Subsequently, the reception end may process the uplink channel of the transmission end located in the short range such that allocation is performed on an $n^{th}$ TTI which is the original location like legacy processing and process the uplink channel of the transmission end located in the long range such that allocation is performed on an $n+1^{th}$ TTI to have 1 TTI offset.

When the scheduling is performed as described above, a modem receiver according to the first embodiment compares two demodulations performed on the same data and performs processing only one time, thereby preventing an increase in complexity at the reception end.

Meanwhile, since the uplink subframe boundary which is the time point at which the model operates for each TTI should be changed, a preprocessing block providing uplink data may be required to differently control buffering for respective TTIs according to a preset time offset.

Figure 9:
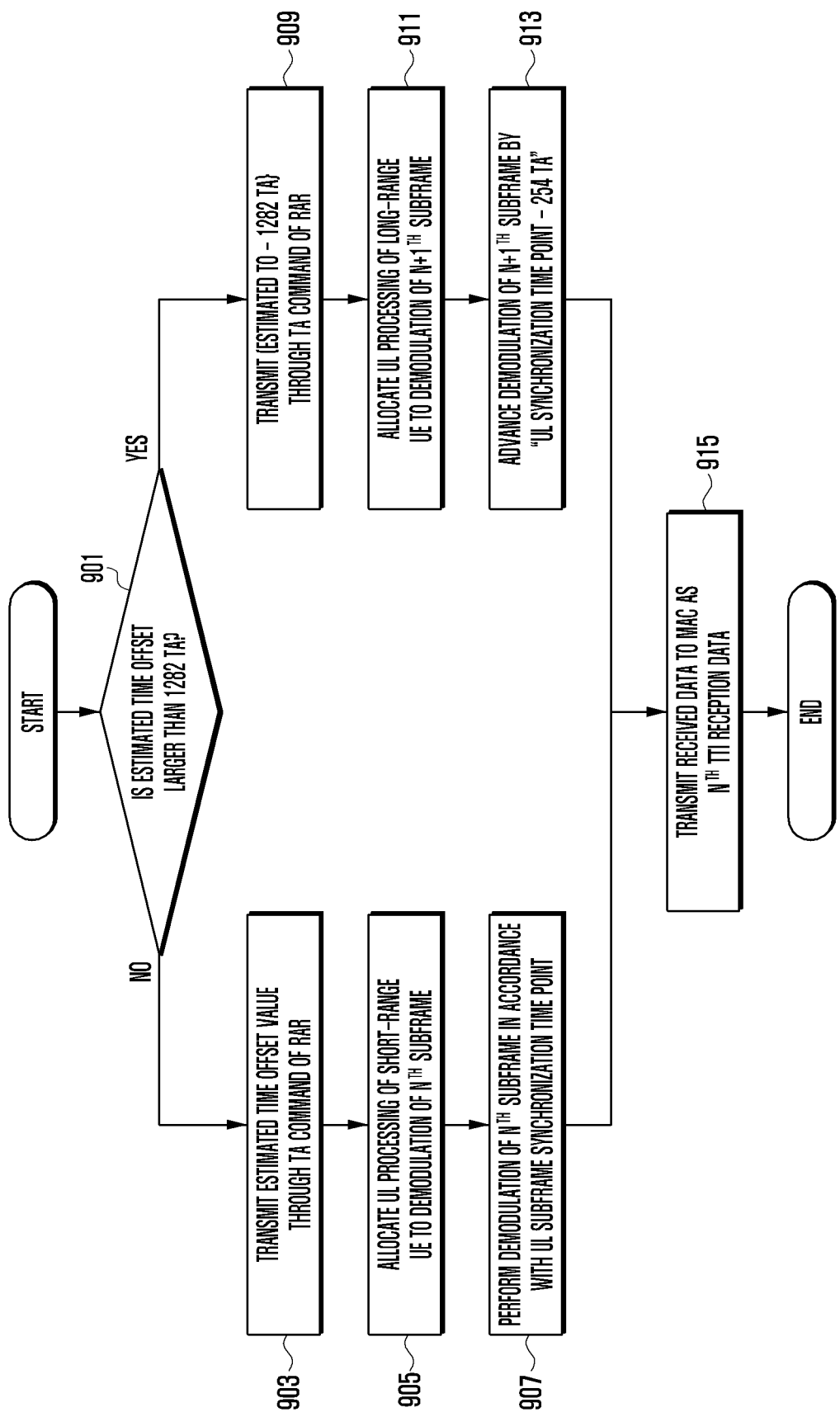
FIG. 9 is another example of the flowchart illustrating the operation of supporting uplink synchronization of the wide cell radius according to an embodiment of the disclosure.

FIG. 9 is another example of the flowchart illustrating the operation of supporting uplink synchronization of the wide cell radius according to an embodiment of the disclosure.

Referring to FIG. 9, according to the second embodiment, the reception end may support uplink synchronization of the wide cell radius using an improved transmission time interval (TTI) scheduler.

First, in step 901, the reception end may determine whether a time offset estimated from the RACH signal is larger than or equal to 1282 TA.

When the estimated time offset is equal to or smaller than 1282 TA, the reception end may insert a TA command including the estimated time offset as the correction time value into an RAR signal and provide the RAR signal to the transmission end (for example, the UE) located in the short range in step 903.

The reception end may allocate data through the uplink received from the transmission end located in the short range to demodulation of an $n^{th}$ subframe in step 905.

Thereafter, in step 907, the reception end may perform demodulation of the nth subframe in accordance with the uplink synchronization time point.

Meanwhile, when the estimated time offset is larger than or equal to 1282 TA on the basis of the determination result of step 901, the reception end may insert a TA command including a value obtained by subtracting 1282 TA from the estimated time offset as the correction time value into the RAR signal and provide the RAR signal to the transmission end in step 909.

The reception end may allocate data through the uplink received from the transmission end located in the short range to demodulation of an $n+1^{th}$ subframe and process the demodulation in step 911.

Thereafter, in step 913, the reception end may advance the demodulation of $n+1^{th}$ subframe by a value obtained by subtracting 254 TA from the uplink synchronization time point.

After step 907 or 913, the reception end may transmit the received data to the MAC as $n^{th}$ TTI reception data in step 915.

According to the third embodiment, there is a method of separately operating frequency resources.

In the LTE system, when a Carrier aggregation (CA) scheme using a multi-carrier is operated, downlink synchronization and uplink synchronization may be differently operated through separation of a primary cell (PCell) group and a secondary cell (SCell) group.

In this case, it is possible to distinguish the transmission end located in the short range and the transmission end located in the long range through the RACH signal detection and allocate the short-range transmission end to the PCell and the long-range transmission end to the SCell. That is, the PCell group may operate in accordance with synchronization between downlink and uplink based on 0 TA, and the SCell group may operate in accordance with synchronization between downlink and uplink based on 1282 TA. Accordingly, the operation is possible without any change in an end of a physical layer (PHY).

Meanwhile, the operation in accordance with synchronization between downlink and uplink may mean that data is transmitted in the downlink 1282 TA earlier than in the uplink when the reception end performs processing at the end of the PHY so that, when the transmission end located in the long range transmits uplink data immediately after performing downlink synchronization, the reception end receives uplink data based on 0 TA. This may result in an effect of pulling the transmission end located in the long range within the cell radius of about 100 km or wider toward the BS by about 100 km.

Figure 10:
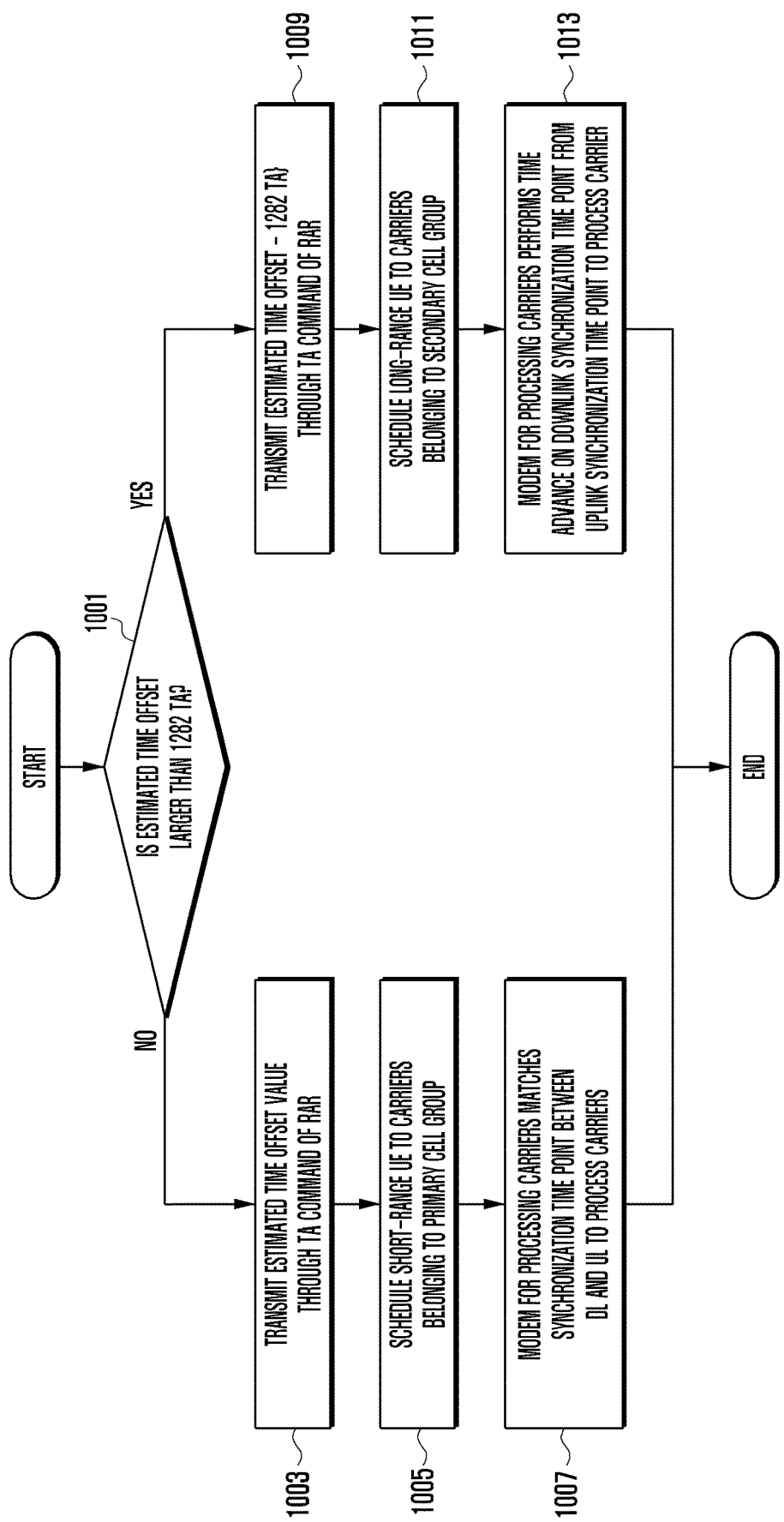
FIG. 10 is still another example of the flowchart illustrating the operation of supporting uplink synchronization of the wide cell radius according to an embodiment of the disclosure.

FIG. 10 is still another example of the flowchart illustrating the operation of supporting uplink synchronization of the wide cell radius according to an embodiment of the disclosure.

Referring to FIG. 10, according to the third embodiment, the reception end may support uplink synchronization of the wide cell radius by separately operating frequency resources.

First, in step 1001, the reception end may determine whether a time offset estimated from the RACH signal is larger than or equal to 1282 TA.

When the estimated time offset is equal to or smaller than 1282 TA, the reception end may insert a TA command including the estimated time offset as the correction time value into an RAR signal and provide the RAR signal to the transmission end located in the short range in step 1003.

In step 1005, the reception end may schedule the transmission end located in the short range to carriers belonging to the PCell.

Subsequently, in step 1007, a modem processing the carriers of the reception end may match the synchronization time point between downlink and uplink on the basis of the OTA to process the carriers.

Meanwhile, when the estimated time offset is larger than or equal to 1282 TA on the basis of the determination result of step 1001, the reception end may insert a TA command including a value obtained by subtracting 1282 TA from the estimated time offset as the correction time value into an RAR signal and provide the RAR signal to the transmission end in step 1009.

Subsequently, in step 1011, the reception end may schedule the long-range transmission end of which the time offset is larger than or equal to 1282 TA to carriers belonging to the SCell.

In step 1013, a model processing the carriers of the reception end may advance the downlink synchronization time point by a predetermined time (for example, 1282 TA) from the uplink synchronization time point to process the carriers.

Figure 11:
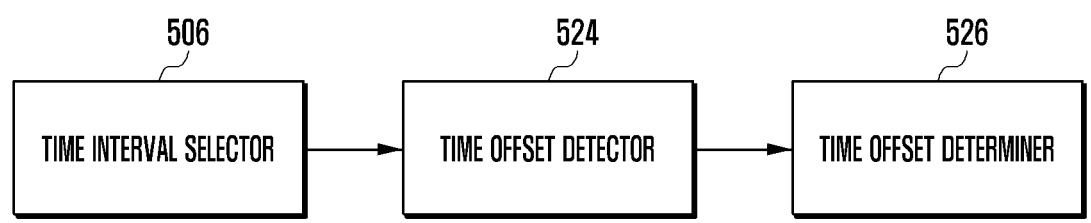
FIG. 11 illustrates the configuration of the reception end supporting ranging access of the wide cell radius according to another embodiment of the disclosure.

FIG. 11 illustrates the configuration of the reception end supporting ranging access of the wide cell radius according to another embodiment of the disclosure.

Referring to FIG. 11, the reception end (for example, the BS) may include a time interval selector 506, a time offset detector 524, and a time offset determiner 526.

The time interval selector 506 of FIG. 11 may correspond to the first ranging signal time interval selector 506-1 and the second ranging signal time interval selector 506-2 of FIG. 5.

The time offset detector 524 may correspond to the first time offset detector 524-1 and the second time offset detector 524-1 of FIG. 5, and the time offset determiner 526 may correspond to the time offset determiner 526 of FIG. 5.

According to various embodiments, the time interval selector 506 may select a first detection time interval and a second detection time interval in RACH signals including RACH preamble sequences for ranging access. Subsequently, the time offset detector 524 may detect a first time offset and a second time offset which are time points at which preamble sequences are received in the selected first time interval and second detection time interval. The time offset determiner 526 may determine a correction time value for correcting a time point at which the transmission end of the wireless communication system transmits data on the basis of the detected first time offset and second time offset. At this time, the RACH signal may include a cyclic prefix (CP) interval which is a protection interval, an RACH preamble sequence interval, and a GT interval which is an interference prevention interval (guard time).

According to various embodiments, the reception end may further include a signal intensity detector. The signal intensity detector may correspond to the first signal intensity detector 522-1 and the second signal intensity detector 522-2 of FIG. 5. In this case, the signal intensity detector may detect a first signal intensity and a second signal intensity in the first detection time interval and the second detection time interval, respectively. The time offset determiner 526 may determine a correction time value for correcting the time point at which the transmission end of the wireless communication system transmits data on the basis of the detected first time offset, second time offset, first signal intensity, and second signal intensity.

According to various embodiments, a start point of the first detection time interval may be delayed by a predetermined time from a start point of a subframe in consideration of a round trip delay (RTD) time between the reception apparatus and the transmission apparatus.

According to various embodiments, a start point of the second detection time interval may be delayed by a predetermined time from the start point of the first detection time interval in consideration of the RTD time between the reception apparatus and the transmission apparatus.

According to various embodiments, the time offset determiner 526 may estimate a time offset in consideration of a round trip delay (RTD) time on the basis of the detected first time offset and second time offset. The time offset determiner 526 may determine the correction time value for correcting the time point at which the transmission end transmits data using the estimated time offset value. In this case, when the time offset is estimated, the time offset determiner 526 may convert the second time offset into a modulo value in consideration of the RTD value.

According to various embodiments, when the transmission end is located within a long-range radius from the reception end, the correction time value may be a value determined to transmit data with a delay of a predetermined time from an uplink synchronization location with the transmission end in consideration of the RTD time. In this case, the long-range radius may be a distance longer than or equal to about 100 km from the reception end, and the predetermined time may be a value of about 1282 TA.

According to various embodiments, the reception end may further include a transmission unit (transmitter) configured to insert the correction time value into a random access response (RAR) signal which is a response to the RACH signal and transmit the RAR signal.

Figure 12:
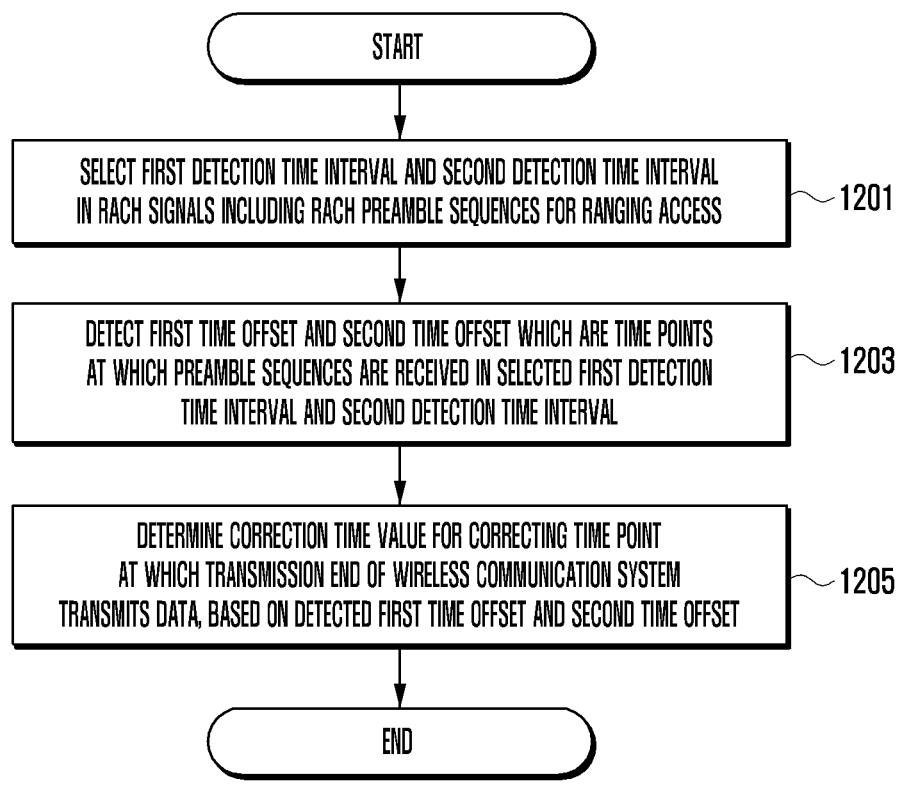
FIG. 12 is a flowchart illustrating a method by which a reception end of a wireless communication system determines a correction time according to an embodiment of the disclosure.

FIG. 12 is a flowchart illustrating a method by which a reception end of a wireless communication system determines a correction time according to an embodiment of the disclosure.

Referring to FIG. 12, in step 1201, the reception end may select a first detection time interval and a second detection time interval in RACH signals including RACH preamble sequences.

In this case, a start point of the first detection time interval may be delayed by a predetermined time from the start point of the subframe in consideration of an RTD time between the reception end and the transmission end. A start point of the second detection time interval may be delayed by a predetermined time from the start point of the first detection time interval in consideration of the RTD time between the reception end and the transmission end.

Subsequently, in step 1203, the reception end may detect a first time offset and a second time offset which are time points at which preamble sequences are received in the selected first detection time interval and second detection time interval, respectively.

In step 1205, the reception end may determine a correction time value for correcting a time point at which the transmission end of the wireless communication system transmits data on the basis of the detected first time offset and second time offset.

According to various embodiments, the method of determining the correction time may further include an operation of detecting a first signal intensity and a second signal intensity in the first detection time interval and the second detection time interval, respectively. In this case, the operation of determining the correction time value may include determining the correction time value for correcting the time point at which the transmission end of the wireless communication system transmits data on the basis of the detected first time offset, second time offset, the first signal intensity, and second signal intensity.

According to various embodiments, the operation of determining the correction time value may include estimating a time offset in consideration of a round trip delay (RTD) time on the basis of the detected first time offset and second time offset and determining the correction time value for correcting the time point at which the transmission end transmits data using the time offset value. In this case, when the time offset is estimated, the time offset may be estimated by converting the second time offset into a modulo value in consideration of the RTD value.

According to various embodiments, when the transmission end is located within a long-range radius from the reception end, the correction time value may be a value determined to transmit data with a delay of a predetermined time from an uplink synchronization location with the transmission end in consideration of the RTD length. In this case, the long-range radius may be a distance longer than or equal to about 100 km from the reception end, and the predetermined time may be a value of about 1282 TA.

According to various embodiments, when the correction time value for correcting the time point at which data is transmitted is determined, the correction time value may be transmitted while being included in an RAR signal which is a response to the RACH signal.

According to various embodiments, the RACH signal may include a cyclic prefix (CP) interval which is a protection interval, an RACH preamble sequence interval, and a GT interval which is an interference prevention interval (guard time) with a next subframe.

The disclosure presents a method of estimating time offsets of preamble sequences transmitted from the transmission end located in a wide cell radius wider than or equal to about 100 km and a method of performing uplink synchronization according thereto. Meanwhile, although description about detailed operation or changes is not made in embodiments of the disclosure to help easy understanding, the method of estimating time offsets and performing uplink synchronization using the time offsets can be implemented and changed in various ways by those skilled in the art.

Further, various embodiments of the disclosure are not limited to the 3GPP LTE system but can be applied to various wireless communication systems having a ranging procedure and performing communication through synchronization between the reception end and the transmission end. For example, embodiments of the disclosure can be applied to wireless communication systems such as eMTC, NB-IoT, and V2X.

At least some of the reception end (for example, modules or functions thereof) or the method (for example, operations) of the disclosure according to an embodiment may be implemented as instructions stored in non-transitory computer-readable media in the form of a program module. When the instructions are executed by a processor, the processor may perform functions corresponding to the instructions.

The program may be stored in a non-transitory computer-readable recording medium read and executed by a computer, and thus embodiments of the disclosure can be performed.

The non-transitory recording medium may include not only machine-readable media semipermanently storing data but also volatile or non-volatile memory such as register, cache, or buffer for temporarily storing data for calculation or transmission. On the other hand, transitory transmission media such as signals or currents do not correspond to non-transitory recording media.

Specifically, the programs may be provided while being stored in non-transitory-readable recording media such as CD, DVD, hard disk, blu-ray disc, USB, internal memory of the device of the disclosure, memory card, ROM, or RAM.

The programs may be stored in a memory of a server and may be transmitted to a terminal (for example, the device according to the disclosure) connected to the server through a network or transferred to or registered in the server by a program provider (for example, a program developer or a program manufacturer) to be sold.

When the programs are sold to the terminal from the server, at least some of the programs may be temporarily generated in a buffer of the server to be transmitted. In this case, the buffer of the server may be the non-transitory recording medium of the disclosure.

According to an embodiment, a computer-readable non-transitory recording medium may store a program causing the reception end according to the disclosure to perform an operation of selecting a first detection time interval and a second detection time interval in random access channel (RACH) signals including RACH preamble sequences for ranging access, an operation of detecting a first time offset and a second time offset which are time points at which the preamble sequences are received in the selected first detection time interval and second detection time interval, respectively, and an operation of determining a correction time value for correcting a time point at which a transmission end of the wireless communication system transmits data, based on the detected first time offset and second time offset.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The invention claimed is:

1. A reception apparatus in a wireless communication system, the reception apparatus comprising:
   a transceiver; and
   at least one processor configured to:
      select a first detection time interval and a second detection time interval for receiving a random access channel (RACH) signal including a RACH preamble sequence,
      determine whether the RACH preamble sequence is detected in the first detection time interval or the RACH preamble sequence is detected in the second detection time interval,
      when the RACH preamble sequence is detected in the second detection time interval, identify a second time offset based on a time point at which the RACH preamble sequence is received in the second detection time interval,
      determine a correction time value for correcting a time point at which a transmission apparatus of the wireless communication system transmits data, based on the second time offset,
      identify that the correction time value is greater than a predetermined value, and
      determine a time advance (TA) value as the correction time value minus the predetermined value,
      when the RACH preamble sequence is detected in the first detection time interval, identify a first time offset based on a time point at which the RACH preamble sequence is received in the first detection time interval, determine the correction time value for correcting the time point at which the transmission apparatus transmits data based on the first time offset, and determine the TA value as the correction time value, and
      transmit, to the transmission apparatus via the transceiver, a single random access response (RAR) message including the determined TA value as a response to the RACH signal.

2. The reception apparatus of claim 1, wherein the at least one processor is further configured to:
   detect a first signal intensity and a second signal intensity in the first detection time interval and the second detection time interval, respectively, and
   determine whether the RACH preamble sequence is detected in the first detection time interval or the RACH preamble sequence is detected in the second detection time interval, based on the first signal intensity and second signal intensity.

3. The reception apparatus of claim 1,
   wherein a start point of the first detection time interval is delayed by a predetermined time from a start point of a subframe in consideration of a round trip delay (RTD) time between the reception apparatus and the transmission apparatus, and
   wherein a start point of the second detection time interval is delayed by a predetermined time from the start point of the first detection time interval in consideration of the RTD time between the reception apparatus and the transmission apparatus.

4. The reception apparatus of claim 1, wherein, the correction time value is a value determined to transmit data with a delay of a time from an uplink synchronization location with the transmission apparatus in consideration of a round trip delay (RTD) time value, when the transmission apparatus is located outside a predetermined radius from the reception apparatus.

5. The reception apparatus of claim 4, wherein the predetermined radius is a radius of 100 km from the reception apparatus, and the time from the uplink synchronization location is a value of 1282TA.

6. The reception apparatus of claim 1, wherein the RACH signal includes a cyclic prefix (CP) interval which is a protection interval, an RACH preamble sequence interval, and a guard time (GT) interval which is an interference prevention interval with a next subframe.

7. A method performed by a reception apparatus of a wireless communication system, the method comprising:
  selecting a first detection time interval and a second detection time interval for receiving a random access channel (RACH) signal including a RACH preamble sequence;
  determining whether the RACH preamble sequence is detected in the first detection time interval or the RACH preamble sequence is detected in the second detection time interval;
  when the RACH preamble sequence is detected in the second detection time interval, identifying a second time offset based on a time point at which the RACH preamble sequence is received in the second detection time interval,
  determining a correction time value for correcting a time point at which a transmission apparatus of the wireless communication system transmits data, based on the second time offset,
  identifying that the correction time value is greater than a predetermined value, and
  determining a time advance (TA) value as the correction time value minus a predetermined value;
  when the RACH preamble sequence is detected in the first detection time interval, identifying a first time offset based on a time point at which the RACH preamble sequence is received in the first detection time interval, determining the correction time value for correcting the time point at which the transmission apparatus transmits data, based on the first time offset, and determining the TA value as the correction time value; and
  transmitting, to the transmission apparatus, a single random access response (RAR) message including the determined TA value as a response to the RACH signal.

8. The method of claim 7, wherein the determining of whether the RACH preamble sequence is detected in the first detection time interval or the RACH preamble sequence is detected in the second detection time interval comprises:
  detecting a first signal intensity and a second signal intensity in the first detection time interval and the second detection time interval, respectively, and
  determining whether the RACH preamble sequence is detected in the first detection time interval or the RACH preamble sequence is detected in the second detection time interval, based on the first signal intensity and second signal intensity.

9. The method of claim 7,
  wherein a start point of the first detection time interval is delayed by a predetermined time from a start point of a subframe in consideration of a round trip delay (RTD) time between the reception apparatus and the transmission apparatus, and
  wherein a start point of the second detection time interval is delayed by a predetermined time from the start point of the first detection time interval in consideration of the RTD time between the reception apparatus and the transmission apparatus.

10. The method of claim 7,
  wherein the correction time value is a value determined to transmit data with a delay of a time from an uplink synchronization location with the transmission apparatus in consideration of a round trip delay (RTD) time value, when the transmission apparatus is located outside a predetermined radius from the reception apparatus, and
  wherein the predetermined radius is a radius of 100 km from the reception apparatus, and the time from the uplink synchronization location is a value of 1282TA.

11. The method of claim 7, wherein the RACH signal includes a cyclic prefix (CP) interval which is a protection interval, an RACH preamble sequence interval, and a guard time (GT) interval which is an interference prevention interval with a next subframe.

* * * * *